Patented Feb. 24, 1948

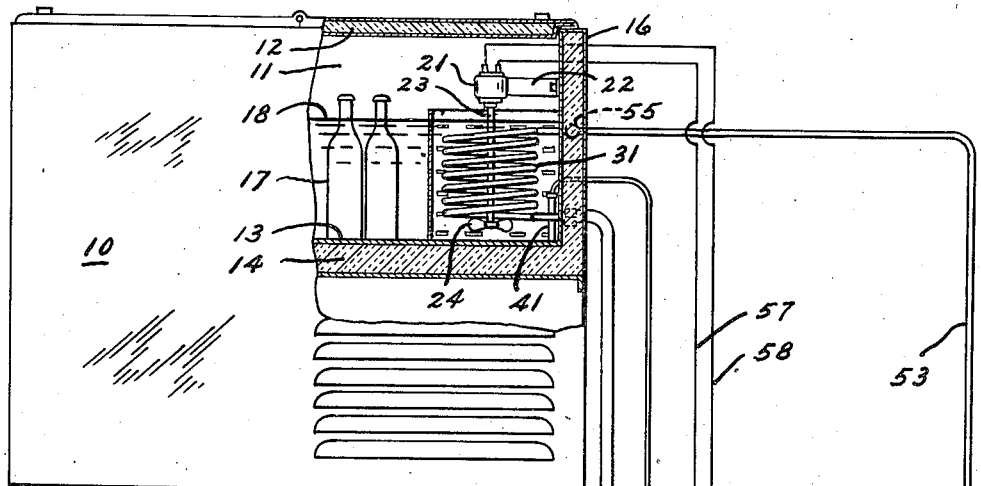

2,436,426

UNITED STATES PATENT OFFICE 2,436,426

REFRIGERATION APPARATUS INCLUDING A DIRECT-CURRENT COMPRESSOR MOTOR AND AN ALTERNATING-CURRENT AGITATOR MOTOR

Mortimer W. Fish, Dayton, Ohio, assignor to General Motors Corporation, Dayton, Ohio, a corporation of Delaware Application March 19, 1945, Serial No. 583,580

5 Claims. (Cl. 62—141)

1

This invention relates to refrigeration and particularly to means for driving certain elements included in a refrigerating system.

In certain types of refrigerator installations such, for example, as bottled beverage coolers wherein bottled beverages are cooled and stored in a body of liquid it is desirous to agitate and cause circulation of the cooling liquid to more rapidly and uniformly chill the contents of the bottles. For this purpose an agitator is usually located in the body of liquid. Such an agitator is small and is relatively easy to operate thus ordinarily requiring the use of only a fractional horsepower motor to drive same. It is impossible to obtain a practical fractional horsepower motor to be operated by direct current for such a purpose and therefore in certain localities, provided with direct current only, the problem of furnishing a low cost trouble-free agitator motor is present. It is, on the other hand, possible to obtain small fractional horsepower motors to be operated from a source of alternating current electricity. In view of these circumstances it is contemplated to employ in a bottled beverage cooling and storage apparatus an alternating current motor for driving the agitator and to supply alternating current to this motor by means of an alternating current take-off incorporated in a dynamoelectric machine supplied with direct current and utilized for operating other elements of a refrigerating system associated with the apparatus.

An object of my invention is to provide an improved refrigerating apparatus for installation in localities provided with direct current only and in which apparatus it is desired to employ a small or fractional horsepower motor to operate an agitator or the like and to supply this motor with alternating current furnished by a direct current operated dynamoelectric machine which drives another element or elements of the refrigerating system associated with the apparatus.

A further and more specific object of my invention is to utilize a direct current operated dynamoelectric machine to drive the compressor of a refrigerating system and to operate a fan for circulating air over the condenser of the system which machine has incorporated therein mechanism for converting part of the direct current supplied thereto into alternating current and to utilize this alternating current for operating a motor of an agitator or the like employed in the refrigerating system for circulating a fluid over or in contact with articles to be cooled by the system.

Further objects and advantages of the present

2 invention will be apparent from the following description, reference being had to the accompanying drawings, wherein a preferred form of the present invention is clearly shown.

In the drawings:

Fig. 1 is a view partly in elevation and partly in section of a bottled beverage cooling and storing apparatus diagrammatically showing a refrigerating system associated therewith and having my invention embodied therein; and Fig. 2 is a diagrammatic view and wiring circuit of a dynamoelectric machine shown in Fig. 1 as operatively connected to the compressor of the refrigerating system.

Referring to the drawings, for illustrating my invention, I have shown in Fig. 1 thereof a bottled beverage cooling and storing apparatus comprising a cabinet 10 having an open top compartment 11 therein normally closed by suitable doors 12. A metal liner 13 forms walls of the compartment 11 and any suitable or desirable insulating material 14 may be interposed between liner 13 and outer metal walls 16 of cabinet 10. Compartment 11 may receive a plurality of bottled beverages represented at 17 and contains a fluid or a body of liquid 18 in which the bottles 17 are partially submerged. An alternating current operated motor 21 is disposed within compartment 11 of cabinet 10 and is secured to a side wall thereof by suitable brackets or the like 22. Motor 21 is located above the level of the body of liquid 18 in compartment 11 with its shaft 23 extending downwardly therefrom and upon the end of which shaft is mounted an agitator 24 in the form of a small fan or propeller. Operation of motor 21 rotates the agitator 24 and causes agitation and circulation of liquid within the compartment 11.

A closed refrigerating system associated with the apparatus includes an evaporator or cooling element 31 in the form of a coil located within compartment 11 and submerged in the body of liquid therein. The refrigerating system also includes a refrigerant liquefying unit comprising a direct current operated dynamoelectric machine 32 drivingly connected with a compressor 33, through belt and pulley connections 34, 35 and 36, and a condenser 37 having a receiver 38 associated therewith. Pulley 35 on the shaft of the dynamoelectric machine 32 has a fan or blower 39 mounted thereon for forcing air over the condenser 37. A thermostat bulb 41 positioned in compartment 11, so as to be responsive to the temperature of the body of liquid therein, communicates, through a conduit 43, with a switch 42 for controlling the electric circuit leading to machine 32. The bulb 41, conduit 43 and the diaphragm or bellows which is mounted in the switch 42 to actuate same comprises a closed circuit charged with a suitable volatile fluid. Switch 42 is interposed in the direct current supply line, wires 44 and 45, leading to the dynamoelectric machine and actuation thereof, in response to pressures within the closed thermostatic system, opens and/or closes the circuit to machine 32. Operation of machine 32 drives the compressor 33 and fan 39. Compressor 33 withdraws evaporated refrigerant from the cooling coil 31, through a conduit 51, and compresses the refrigerant vapor whereupon it is forwarded under pressure through a conduit 52 into the condenser 37. Air being circulated over condenser 37 by fan 39 cools and causes condensation of the compressed refrigerant and the condensed or liquefied refrigerant flows into the receiver 38. Liquid refrigerant is conveyed, by a conduit 53, from receiver 38 to the evaporator or coil 31 for re-evaporation therein to cool the body of liquid 18 in compartment 11 and consequently bottled beverages stored therein. A restrictor or expansion valve 55 interposed in conduit 53 may control the entrance of liquid refrigerant into the evaporator 31. The dynamo electric machine 32 is electrically connected with the agitator motor 21 by wires 57 and 58 and is a machine of the type that has means therein for converting a part of the direct current supplied thereto into alernating current which is forwarded to motor 21 through these wires for causing operation of motor 21 each time machine 32 is put in operation by actuation of the switch 42 to close the circuit thereto. Operation of motor 21 drives the fan or propeller 24 to agitate the liquid 18 and to circulate the fluid over the cooling coil 31 to thereby more quickly and uniformly cool the body of cooling fluid and consequently bottled beverages stored in compartment 11.

The direct current operated dynamoelectric machine 32 comprises a shunt field 61 and series fields 62 and 63 (see Fig. 2) connected by wires 64 and 65 to brushes 66 and 67 which bear against a commutator 68 on the shaft 69 of the machine. Armature coils 71 are connected to the segments of the commutator 68 and ring conductors 72 and 73 are mounted on the end of shaft 69 opposite the commutator end thereof. Wire 74 extending between a certain segment of the commutator 68 and slip ring conductor 72 together with wire 75 extending between another segment of commutator 68 and slip ring conductor 73 provide an alternating current take-off. Brushes 76 and 77 bearing against the conductor rings 72 and 73 respectively, are connected to the agitator motor 21 by the wires 57 and 58. The elements just described and illustrated in Fig. 2 of the drawings constitute current converting mechanism incorporated in the dynamoelectric machine 32. Thus some of the direct current supplied to machine 32 is converted into alternating current and is directed by the conductor rings 72 and 73, brushes 76 and 77 and wires 57 and 58 to motor 21 for operating same.

I have provided a novel arrangement in a refrigerating system for operating a small fractional horsepower motor in localities provided with direct current only. By making provisions to utilize an alternating current motor in a refrigerating system for the purpose described, I eliminate certain sources of trouble at least from one of the motors employed in the system since the alternating current operated agitator motor is devoid of brushes and brush holding mechanism. The employment of a small fractional horsepower alternating current operated motor for driving the agitator requires a minimum amount of space within the refrigerated compartment of the apparatus.

While the form of embodiment of the invention as herein disclosed constitutes a preferred form, it is to be understood that other forms might be adopted, as may come within the scope of the claims which follow.

What is claimed is as follows:

1. A bottled beverage cooling and storing apparatus comprising in combination, a cabinet having a compartment therein in which bottled beverages are stored, a body of liquid in said compartment at least partially submerging the bottled beverages therein, a closed refrigerating system associated with said cabinet and including an evaporator for cooling the body of liquid in said compartment and a refrigerant liquefying unit, an agitator for circulating the liquid in said compartment, an electric motor for operating said agitator, said refrigerant liquefying unit comprising a compressor, a condenser and a direct current operated dynamoelectric machine for driving said compressor, said machine having current converting mechanism incorporated therein for supplying alternating current for said agitator motor, and electrical conducting means connecting said mechanism and said motor.

2. A bottled beverage cooling and storing apparatus comprising in combination, a cabinet having a compartment therein in which bottled beverages are stored, a closed refrigerating system associated with said cabinet and including an evaporator for cooling said compartment and a refrigerant liquefying unit, an agitator for circulating a fluid over the bottled beverages stored in said compartment, an electric motor for operating said agitator, said refrigerant liquefying unit comprising a compressor, a condenser and a direct current operated dynamoelectric machine for driving said compressor, said machine having current converting mechanism incorporated therein for supplying alternating current for said agitator motor, and electric conducting means connecting said mechanism and said motor.

3. A bottled beverage cooling and storing apparatus comprising in combination, a cabinet having a compartment therein in which bottled beverages are stored, a closed refrigerating system associated with said cabinet and including an evaporator for cooling said compartment and a refrigerant liquefying unit, an agitator for circulating a fluid over the bottled beverages stored in said compartment, an alternating current operated motor for driving said agitator, said refrigerant liquefying unit comprising a compressor, a fan, a condenser and a direct current operated dynamoelectric machine for driving said compressor and for driving said fan to circulate air over said condenser, said machine having mechanism incorporated therein for converting a part of the direct current supplied thereto into alternating current for said agitator motor, and means for conducting the converted alternating current to said motor.

4. A cooling and storing apparatus comprising in combination, a cabinet having a storage compartment therein, a closed refrigerating system associated with said cabinet and including an evaporator for cooling said compartment and a refrigerant liquefying unit, an agitator for circulating a fluid in said compartment, an electric motor for operating said agitator, said refrigerant liquefying unit comprising a compressor, a condenser and a direct current operated dynamoelectric machine for driving said compressor, said machine having mechanism incorporated therein for supplying alternating current for said agitator motor, and electric conducting means connecting said mechanism and said motor.

5. A cooling and storing apparatus comprising in combination, a cabinet having a storage compartment therein, a closed refrigerating system associated with said cabinet and including an evaporator for cooling said compartment and a refrigerant liquefying unit, an agitator for circulating a fluid in said compartment, an electric motor for operating said agitator, said refrigerant liquefying unit comprising a compressor, a condenser, means for circulating a cooling fluid over said condenser, and a direct current operated dynamoelectric machine for driving said means and said compressor, said machine having mechanism incorporated therein for supplying alternating current for said agitator motor, and electric conducting means connecting said mechanism and said motor.

MORTIMER W. FISH.

REFERENCES CITED

The following references are of record in the file of this patent:

UNITED STATES PATENTS

| Number | Name | Date |
| --- | --- | --- |
| 2,253,404 | Tanner | Aug. 19, 1941 |
| 2,128,784 | Tull | Aug. 30, 1938 |
| 682,942 | Lamme | Sept. 17, 1901 |
| 2,010,504 | Askin | Aug. 6, 1935 |
| 2,390,182 | Schirrmeister | Dec. 4, 1945 |